(12) United States Patent
Robinson (10) Patent No.: US 11,965,791 B2
(45) Date of Patent: Apr. 23, 2024

(54) PRONY BRAKE DYNAMOMETER WITH DUAL QUAD POWER STATOR, HYDRAULIC PRESSURE EQUALIZER PLATE, ELECTRONIC LOAD CONTROL SYSTEM, AND 270-DEGREE WATER DISTRIBUTION MANIFOLD

(71) Applicant: Delbert Robinson, Pontiac, IL (US)

(72) Inventor: Delbert Robinson, Pontiac, IL (US)

( * ) Notice: Subject to any disclaimer, the term of this patent is extended or adjusted under 35 U.S.C. 154(b) by 0 days.

(21) Appl. No.: 17/661,631

(22) Filed: May 2, 2022

(65) Prior Publication Data
US 2023/0349781 A1    Nov. 2, 2023

(51) Int. Cl.
*G01L 3/20* (2006.01)
*G01M 17/007* (2006.01)

(52) U.S. Cl.
CPC ........... *G01L 3/20* (2013.01); *G01M 17/0072* (2013.01)

(58) Field of Classification Search
CPC ....................................................... G01L 3/20
See application file for complete search history.

(56) References Cited

U.S. PATENT DOCUMENTS

| | | | | |
|---|---|---|---|---|
| 3,068,689 | A * | 12/1962 | Warsaw | G01L 3/20 73/862.12 |
| 4,483,204 | A * | 11/1984 | Warsaw | G01L 3/20 73/862.12 |
| 9,921,117 | B2 * | 3/2018 | Warsaw | G01L 3/18 |
| 10,900,851 | B1 * | 1/2021 | Warsaw | G01L 3/18 |
| 2009/0193909 | A1 * | 8/2009 | Ichige | G01M 17/0072 73/862.08 |
| 2017/0108388 | A1 * | 4/2017 | Warsaw | G01L 3/18 |

* cited by examiner

*Primary Examiner* — Eric S. McCall
(74) *Attorney, Agent, or Firm* — Julie King

(57) ABSTRACT

An improved prony brake dynamometer capable of measuring the power of a prime mover's rotating shaft connected to a cylinder brake drum rotating around a newly designed dual quad power stator (DQPS), with hydraulic pressure equalizer plate (HPEP), controlled by an electronic load control system with inline cooling system (ELCS), cooled by a 270-degree water distribution manifold (WDM). The improvements of the DQPS and HPEP result in maximizing the pressure applied by the stator over the entire surface area of the rotor drum, thereby maximizing the coefficient of friction at the kinetic point of energy and increasing load capacity over previous models. The addition of the ELCS increases the number of potential settings of hydraulic pressure, resulting in thousands of power settings, as opposed to previous models using manual load control valves. The WDM cools the dynamometer load absorption unit more efficiently than previous models.

14 Claims, 6 Drawing Sheets

DUAL QUAD POWER STATOR
WITHIN DYNAMOMETER

DUAL QUAD POWER STATOR
WITHIN DYNAMOMETER
FIGURE 1

HYDRAULIC PRESSURE EQUALIZER
FIG.3

270 DEGREE WATER DISTRIBUTION MANIFOLD WITHOUT SPRAY
FIG.5

270 DEGREE WATER DISTRIBUTION MANIFOLD WITH SPRAY
FIG. 5A

PRONY BRAKE DYNAMOMETER WITH DUAL QUAD POWER STATOR, HYDRAULIC PRESSURE EQUALIZER PLATE, ELECTRONIC LOAD CONTROL SYSTEM, AND 270-DEGREE WATER DISTRIBUTION MANIFOLD

REFERENCE TO RELATED APPLICATIONS

Not Applicable.

DESCRIPTION

The present invention is an improved prony brake dynamometer capable of measuring the power of a prime mover's rotating shaft connected to a cylinder brake drum rotating around a newly designed dual quad power stator (DQPS), with hydraulic pressure equalizer plate (HPEP), controlled by an electronic load control system with inline cooling system (ELCS), cooled by a 270-degree water distribution manifold (WDM).

The present invention relates to an improved prony brake dynamometer, which is a rotational load absorption device used to measure the power of a prime mover. The improvements of the dual quad power stator and hydraulic pressure equalizer plate result in maximizing the pressure applied by the stator over the entire surface area of the rotor drum, thereby maximizing the coefficient of friction at the kinetic point of energy. This improvement increases load capacity over previous models. Also, the addition of an electronic load control system increases the number of potential settings of hydraulic pressure, resulting in thousands of power settings, as opposed to previous models using manual load control valves. The improved prony brake dynamometer also features a new 270-degree water distribution manifold that cools the dynamometer load absorption unit more efficiently than previous models.

BACKGROUND OF THE INVENTION

I, Delbert Robinson, and my sons Chris, Matt, and Jon, bought the corporation A.W. Dynamometer, Inc. from Arthur Warsaw in 2002. As part of that sale, we received the rights to U.S. Pat. No. 4,483,204, dated Nov. 20, 1984. This patent superseded Arthur Warsaw's previous U.S. Pat. No. 3,068,689 dated Dec. 18, 1962. Both of these patents related to prony brake dynamometers using different rotor configurations. U.S. Pat. No. 4,483,204 used drawings depicting multiple drum rotors, and U.S. Pat. No. 3,068,689 used drawings depicting a single drum rotor. Both of these models have been very successful in the marketplace and are still in production at A.W. Dynamometer, Inc. today.

A prony brake generally includes an input shaft connected to a rotating brake drum and then connected directly to a prime mover shaft, such as a tractor PTO shaft, a diesel or gas engine's flywheel plate, or the shaft of an electric motor. The prony brake dynamometer measures with high accuracy the power output generated by the prime mover shaft. The prime mover shaft is attached by driveline to the dynamometer's input shaft, which is bolted to the brake drum rotor, so all the shafts are moving in harmony and on the same axis and at the same RPM. Within the brake drum rotor is a stator with a shaft that is on the same axis as the other shafts. The brake drum rotor has an internal bearing in the front part of the brake drum rotor allowing the front of the stator shaft to seat. The rear of the stator shaft exits through a bearing housing in the brake drum rotor's lid. This allows all the input shafts and the brake drum rotor to rotate around the stator at very high RPM while the stator remains stationary by way of connecting the rear of the stator shaft to a torque arm with a load cell anchored to a metal tank or other fixed immovable object. The retarding force is a function of the stator pistons being forced outward from the stator cylinders by way of hydraulic force, putting pressure on a brake shoe, which applies force onto a frictional material, which makes contact with the inner surface of the brake drum rotor creating a retarding force. This force is transferred through torque bars, which are a part of the stator and then through a stator shaft that is pinned through the stator. The stator force is measured by a torque arm directly attached to the end the stator shaft and connected to a load cell. This force is displayed in foot pounds or newton meters of torque. On the front of the dynamometer is an RPM magnetic pickup reading a sixty-tooth sprocket on the input shaft. The accumulation of these two factors allows the calculation of horsepower (RPM times torque divided by 5252). When a dynamo meter stator applies force to a rotating brake drum rotor, the result is heat (converting mechanical energy of a prime mover back into heat). The heat needs to be dissipated, and this is accomplished by the brake drum rotor being partially submerged in a sealed water tank, with a manifold to distribute incoming cold water across the brake drum rotor and then exiting the hot water through a top drain.

The above descriptions constitute the basic design of the prior two patents. These models all have one characteristic of the stator, and that is a single piston applying pressure to a brake shoe covering 90 degrees of the rotor. There are four single pistons with brake shoes covering the entire 360 degrees of the rotor. This center pressure of a single piston design allows vertical and horizontal twist when force is applied resulting in unequal pressure being applied over the entire surface area. The dual quad power stator (DQPS) in conjunction with a hydraulic pressure equalizer plate (HPEP) as depicted in the present invention eliminates this possibility and drastically improves the performance of the dynamometer by applying equal pressure over the entire rotor surface.

The prior models also use manual load control hydraulic valves. Although these manual valves are adequate, they are not ideal in that they have limited ability to dial in specific loads and maintain them at a set point. The electronic load control system (ELCS) of the present invention has an electronic valve controlled by a data acquisition computer with a real-time dedicated processor that can dial in torque and power loads measured and reported in the thousands, greatly increasing the amount of power settings versus prior models. The ELCS can also hold the loads constant by having a closed loop system that reads the torque cell and adjusts hydraulic pressure accordingly to the valve to maintain a desired load. This is not possible with previous models' manual load control valves.

The current model also features a newly designed 270-degree water distribution manifold that distributes incoming cool water over the side of the rotor and the ends of the rotor. This results in a cross-spray pattern that cools the entire rotor plus provides cooling water to the end bearing and seal housings. This greatly increases cooling capacity and extends the estimated useful life of the dynamometer. Previous models only cooled the side of the rotor.

SUMMARY OF THE INVENTION

The present invention relates to a Prony Brake Dynamometer absorbing and measuring the power of a rotating prime mover shaft. The dynamometer brake drum rotor has an input shaft directly coupled to the prime mover shaft and is partially submerged in an enclosed water tank with a 270-degree cross-spray pattern cooling manifold. The dynamometer dual quad power stator is located within the brake drum rotor and creates a retarding force by applying hydraulic force using an electronic load control system with inline cooling coil, to pistons forcing them outward to a hydraulic pressure equalizer plate, and friction material to make contact with the brake drum rotor. The stator casting has torque bars to transmit the resulting torque to the stator shaft which is connected to a torque arm and load cell.

It is the object of the present invention to increase the torque capacity of the dynamometer stator by providing constant and equal hydraulic pressure over the entire area of friction material making contact with the brake drum rotor. This is accomplished by a newly designed dual quad power stator (DQPS) and a hydraulic pressure equalizer plate (HPEP). The setting of the DQPS and HPEP will be in a single drum application. Prior art used a single piston centered in a brake shoe. This method allows twist both vertical and horizontal of the brake shoe when pressure is applied resulting in unequal pressure being applied to the rotor and potentially areas of the rotor receiving no pressure.

It is the object of the present invention to increase the power control of the dynamo meter by using an electronic load control system (ELCS) that provides a vast increase in the number of power settings achieved, plus the ability to hold the settings via a closed loop system including an electronic valve controlled by a data acquisition computer with a real-time dedicated processor. Prior art uses two manual valves with limited settings and control. Manual valves cannot do a closed loop set point load because they cannot receive an electronic signal to increase or decrease load.

It is the object of the present invention to increase the estimated useful life of the dynamometer by providing cool hydraulic oil to the stator. As part of the ELCS there is a cooling radiator coil positioned after the electronic hydraulic valve. The heat created by the valve turn down, creating increase PSI, is dissipated by an inline radiator coil before it is delivered to the end of the stator shaft and flows through the stator chambers. This hydraulic oil with reduced temperature will benefit the stator and rotor and extend the estimated useful life and performance of the dynamometer. Prior art did not have a method of cooling down the increased hydraulic oil temperature after it exists the hydraulic valve and delivered hot oil to the stator and increased the temperature of the entire dynamometer brake drum rotor assembly, thereby reducing the amount of test time potential and decreasing the life of the dynamometer.

It is the object of the present invention to increase the cooling efficiency of the dynamometer rotor and front and rear bearing and seal housings by using a 270-degree manifold that provides incoming cooling water in a new cross-spray pattern that covers the entire rotor, including the rotor ends, and provides incoming cooling water in the areas of the front and rear bearing and seal housings. This new 270-degree design will extend the estimated useful life of the brake drum rotor, and the front and rear bearing and seal housings. Prior art only used the incoming cool water to hit the rotor side leaving the ends of the rotor and the front and rear bearing housings to be cooled by the increased water temperature of the entire water tank.

BRIEF DESCRIPTION OF DRAWINGS

The appended claims set forth these novel features believed to be characteristics of the invention.

However, the invention itself, as well as further objects and advantages thereof, will best be understood by reference to the following detailed description of preferred embodiments taken in conjunction with the accompanying drawings, where like reference characters identify like elements throughout the various figures in which.

LEGEND FOR DRAWINGS

1. Water tank enclosure
2. Input shaft assembly w/hub.
3. Cradle bearing housing.
4. Tank bearing and seal housings
5. Dynamometer brake drum rotor
   5A. Lids
6. Front bearing in brake drum rotor lid for stator shaft
7. Dual Quad Power Stator
8. Hydraulic Activated Pistons with Centering Guide Pins
9. Hydraulic Pressure Equalizer Plate (HPEP)
10. Load absorption friction material
11. Rotor rear bearing/seal housing in brake drum rotor lid
12. Flange tank rear seal housing with bushing
13. Stator shaft with common hydraulic canal and cylinder ports
14. Torque Arm and Broached Hub
15. Hydraulic Oil Input
16. Load Cell for measuring torque
17. Stator Torque Bars
18. Stator Cylinders
19. Stator Shaft Opening
20. Stator positioning of piston
21. Stator positioning of piston
22. Concave dome with centering hole for piston positioning
23. Holes and milled out area for retracting springs
24. Hydraulic oil reservoir
25. Hydraulic pump
26. Electronic Valve
27. Load control computer/data acquisition computer
28. Hydraulic oil cooling coil
29. Hydraulic oil pressure dump valve
30. Incoming cool water source
31. 270-degree water distribution manifold
32. Warm water outflow drain
33. Water spray pattern for side of brake drum rotor
34. Water spray pattern for front bearing/seal housings and brake drum rotor
35. Water spray pattern for rear bearing/seal housings and brake drum rotor
36. RPM Magnetic Pickup
37. Ring Collars
38. Cylinder Grooves for Piston Seals

DESCRIPTION OF THE INVENTION AND DESCRIPTION OF PREFERRED EMBODIMENTS

Figure 1:
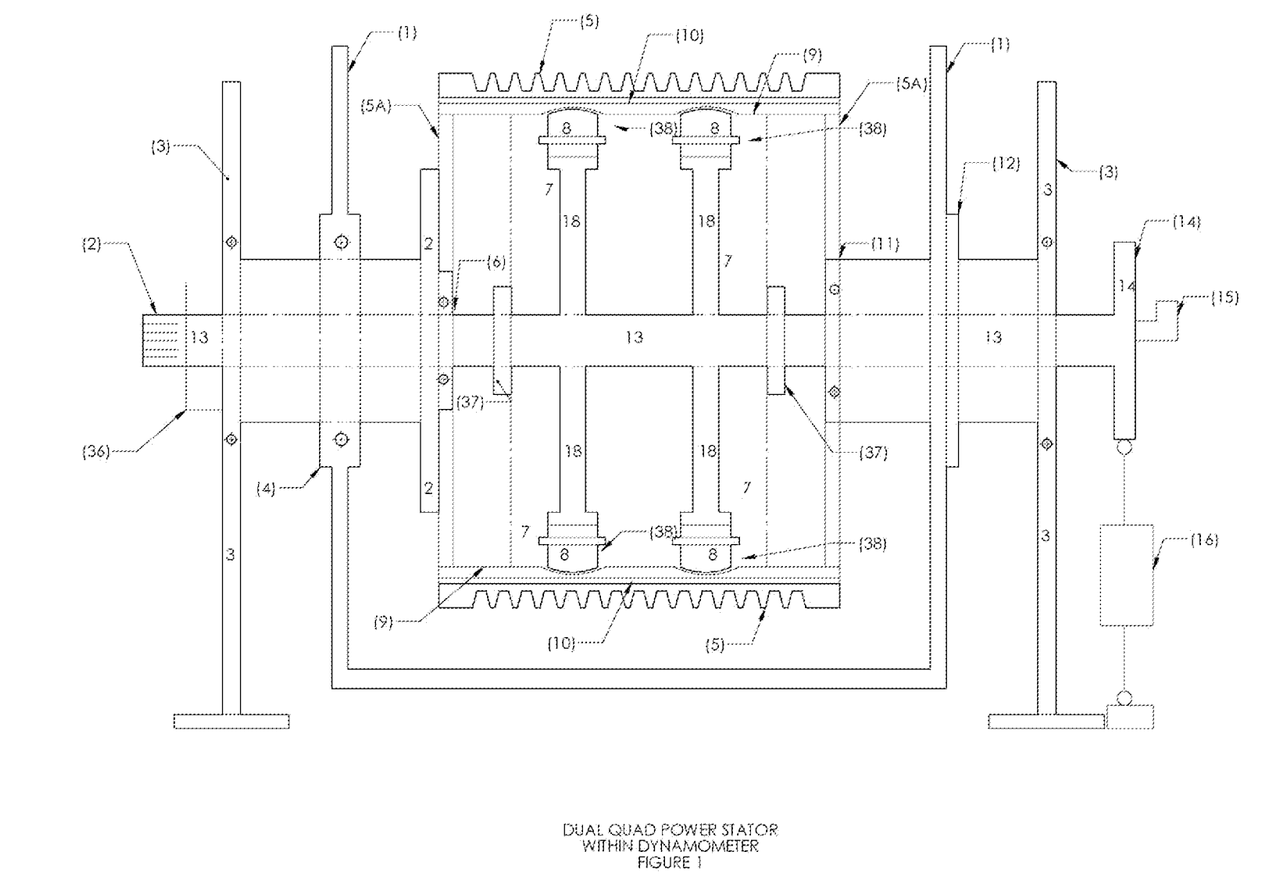
FIG. 1—A longitudinal sectional view of the prony brake dynamometer depicting the brake drum rotor and the present invention of the dual quad power stator (DQPS) and hydraulic pressure equalizer plate (HPEP) shown within.

Referring to FIG. 1, depicted is a longitudinal sectional view of a prony brake dynamometer including the preferred embodiments of a dual quad power stator (DQPS) (7) and a hydraulic pressure equalizer plate (HPEP) (8) within a single brake drum rotor (5) comprised of either a solid grey iron pour casting or a steel tube with end plates (lids). An upper water tank (1) houses the single brake drum rotor (5). The front input rotor shaft assembly and hub (2) proceeds through a front flange bearing and seal housing (4) bolted to the water tank (1) to attach by screws to the brake drum rotor front plate (5). The front bearing and seal housing (4) has its outer diameter enclosed in a trunnion bearing housing (3) allowing the entire upper water tank (1) and its components to be free of any parasitic force restriction. The brake drum rotor (5) and its end plates (lids) (5A) are sealed to protect the inner stator and its lubrication fluid from water contamination. The dual quad power stator (7) has the front of its stator shaft (13) seated in an internal bearing (6) pressed in the front of the brake drum rotor casting (5) or lid (5A). The rear of the stator shaft (13) exits out the rear brake drum rotor lid (5A) through a bearing pressed in the rear lid and a seal housing consisting of a sleeve with multiple lip seals (11). The rear stator shaft (13) and sleeve then exit through a water tank flange seal housing with lip seals proceeding through a trunnion bearing (3) with a bushing (12). The end of the stator shaft (13) is splined to connect to a broached torque arm hub (14). The torque arm (14) has holes drilled 12 inches from the center axis of the stator shaft (13), and a load cell (16) is attached with connectors to the main water tank or other fixed immovable object. Incoming pressurized hydraulic oil, from the electronic load control system and cooling coil (ELCS), enters the stator shaft fitting (15) and proceeds through the stator shaft canal (13) to the cylinders (18) housing the pistons (8). When hydraulically activated, the hydraulic pressure causes the pistons (8) to push outward to a hydraulic pressure equalizer plate (9) to friction material (10) making contact with the rotor (5) at the kinetic point of energy. The resultant force is transferred via torque bars (17) to the stator shaft (13), torque arm (14), and load cell (16). The torque is measured and with the data input from the rpm magnetic pickup (36); horsepower is calculated by the data acquisition computer (27) that exports the calculations and data to a software system capable of loading on any laptop or desktop computer and presenting the calculations and data to a user.

Figure 2:
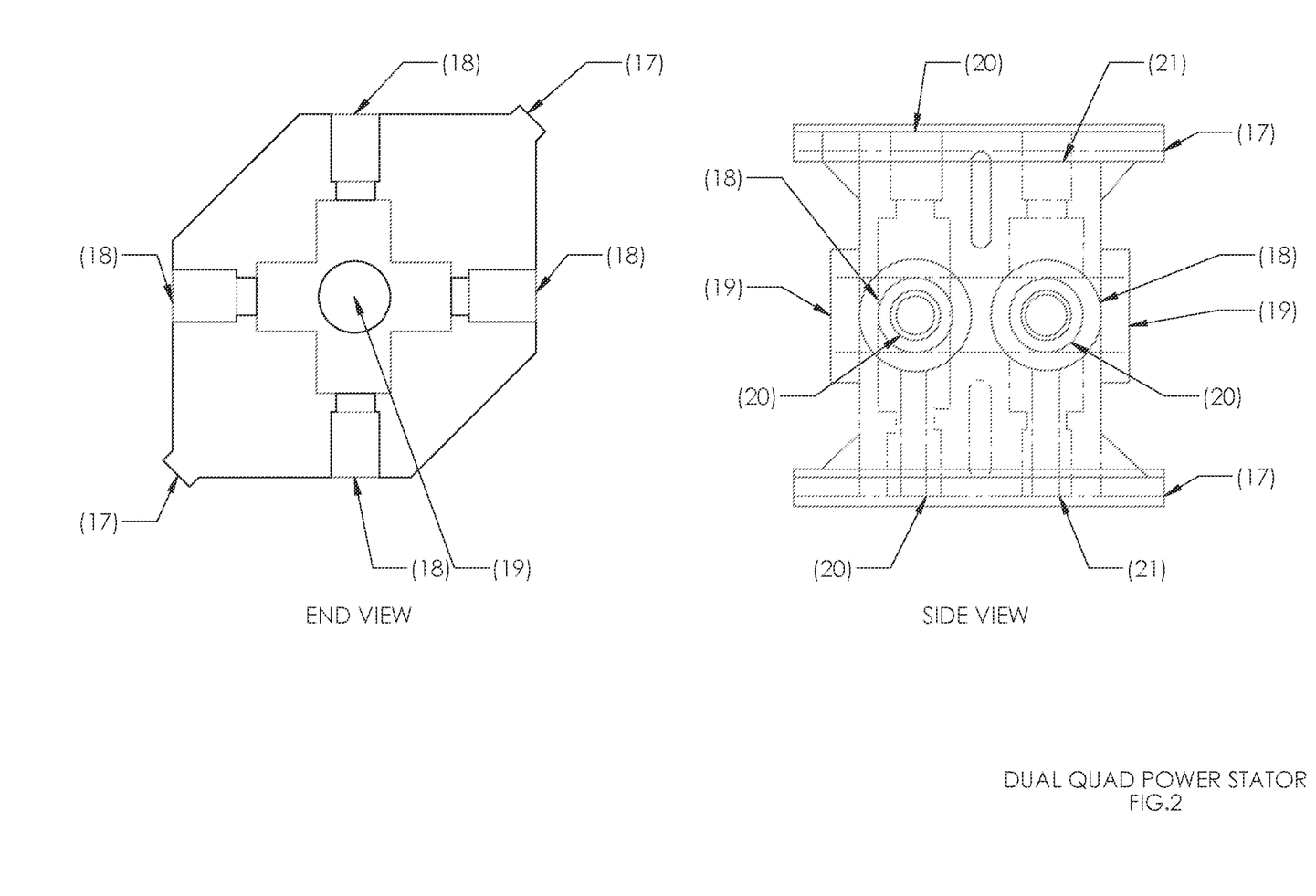
FIG. 2—A drawing depicting a side view and overview of the dual quad power stator (DQPS).
Figure 3:
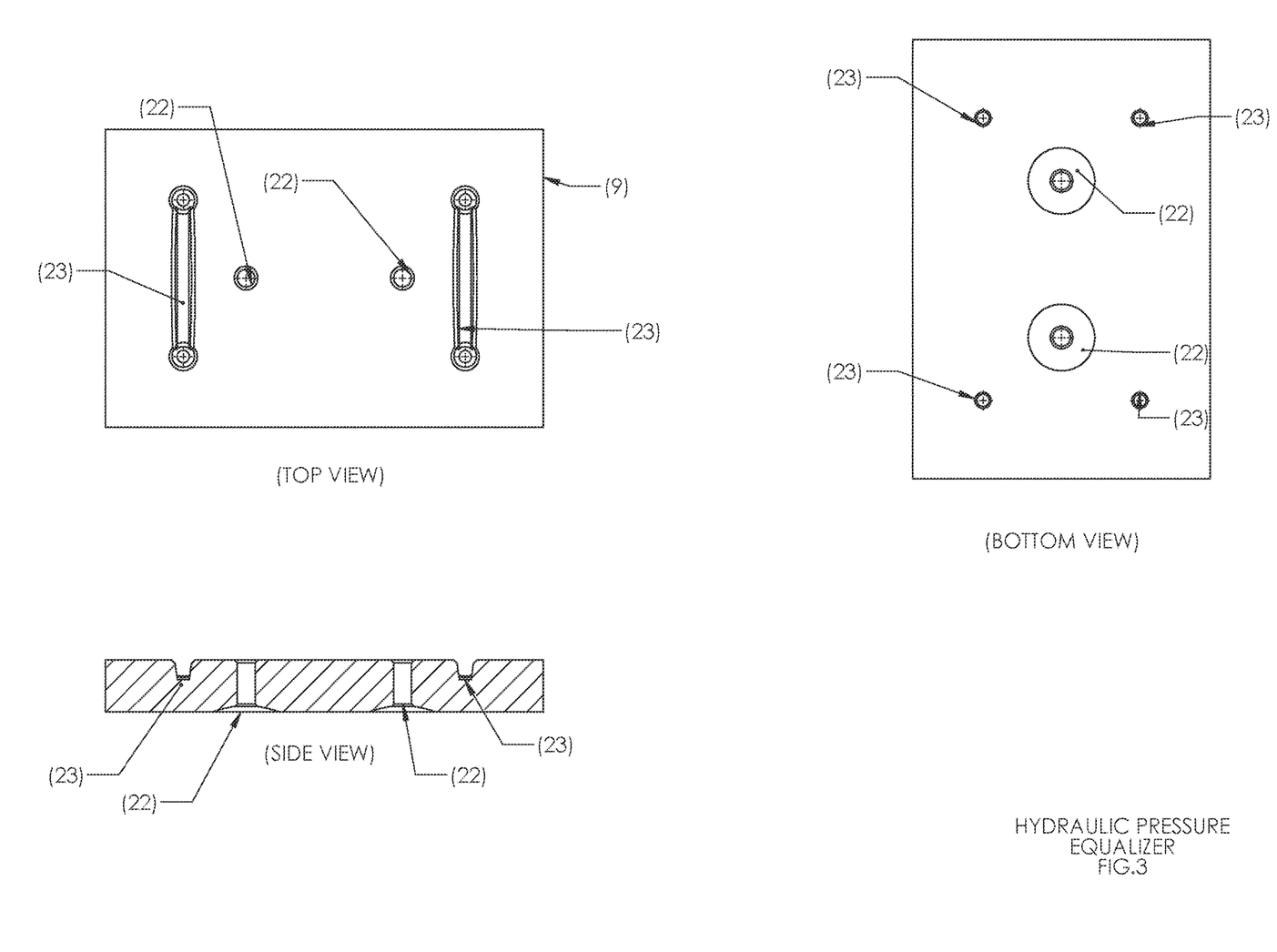
FIG. 3—A drawing depicting an overview and side view of the hydraulic pressure equalizer plate (HPEP).

Referring to FIGS. 1, 2, & 3, the DQPS (7) has eight pistons (8) arranged in two sets of four at 90 degrees to each other. Each domed piston (8) has a pin at the center that engages a centering hole in the reciprocating concave portion of the HPEP (9). The radius of the domed piston (8) and the concave portion of the HPEP (9) are the same, allowing a tight fit when the pistons (8) are hydraulically activated and push outward. The spacing of the two sets of pistons (8) are equally positioned over the length of the DQPS (7) and HPEP (9). With the two sets of pistons and their centering pins docking with the centering holes of the hydraulic pressure equalizer plate, the potential of twist both vertical and horizontal is eliminated. The two-pin design prevents such action. One pin prevents the movement of the other pin. The stator shaft (13) has a common hydraulic canal with open ports to all eight piston cylinders (18). This allows hydraulic pressure (psi) to be equal in all eight cylinders (18) and causes the pistons (8) to move outward with the same force. With the spacing of the pistons (8) and cylinders (18) at equal distance over the length of the stator (13) and rotor (5) this provides pressure being applied equally to the hydraulic pressure equalizer plate (9). And with the outside radius of the HPEP (9) being the same as the inside radius of the brake drum rotor (5) the psi force will be equally applied to the friction material (10) as it makes contact to the rotor (5) at the kinetic point of energy. For instance, assuming a 15-inch rotor (5) and stator (7) length, piston A (20) would be spaced at the 5-inch mark while piston B (21) would be spaced at the 10-inch mark. With a common hydraulic canal (13) with the same psi, say 2000 psi, each cylinder (18) and piston (8) would be exerting 2000 psi force on the hydraulic pressure equalizer plate (9). With a hydraulic pressure equalizer plate (9) being made of a solid gray iron casting, the possibility for vertical flex from the pistons (8) exerting and outward force is eliminated, as is twist, vertical or horizontal from the above stated two pin design. The result is total coverage of friction material (10) over the entire area of the inside diameter of the rotor (5) at the same psi, which results in maximizing the coefficient of friction at the kinetic point of energy. This greatly increases the torque capacity of dynamometer.

Another component of the HPEP (9) design to consider is the drilled holes and milled indentations (23) in the plate. This allows for a retractor spring to be inserted in the HPEP (9) at position 90 degrees and extend over the DQPS (7) to the opposite side where it is inserted in the HPEP (9) at position 270 degrees. The retractor spring ends are then connected to form a loop. This is done on both sides of the HPEP (9). The same procedure is done for the HPEP (9) located at 180 degrees and 360 degrees. This unique design allows the pistons (8) and the HPEP (9) to retract back to its original position of zero outward pressure when the hydraulic pressure is set back to zero by the electronic load control system.

Figure 4:
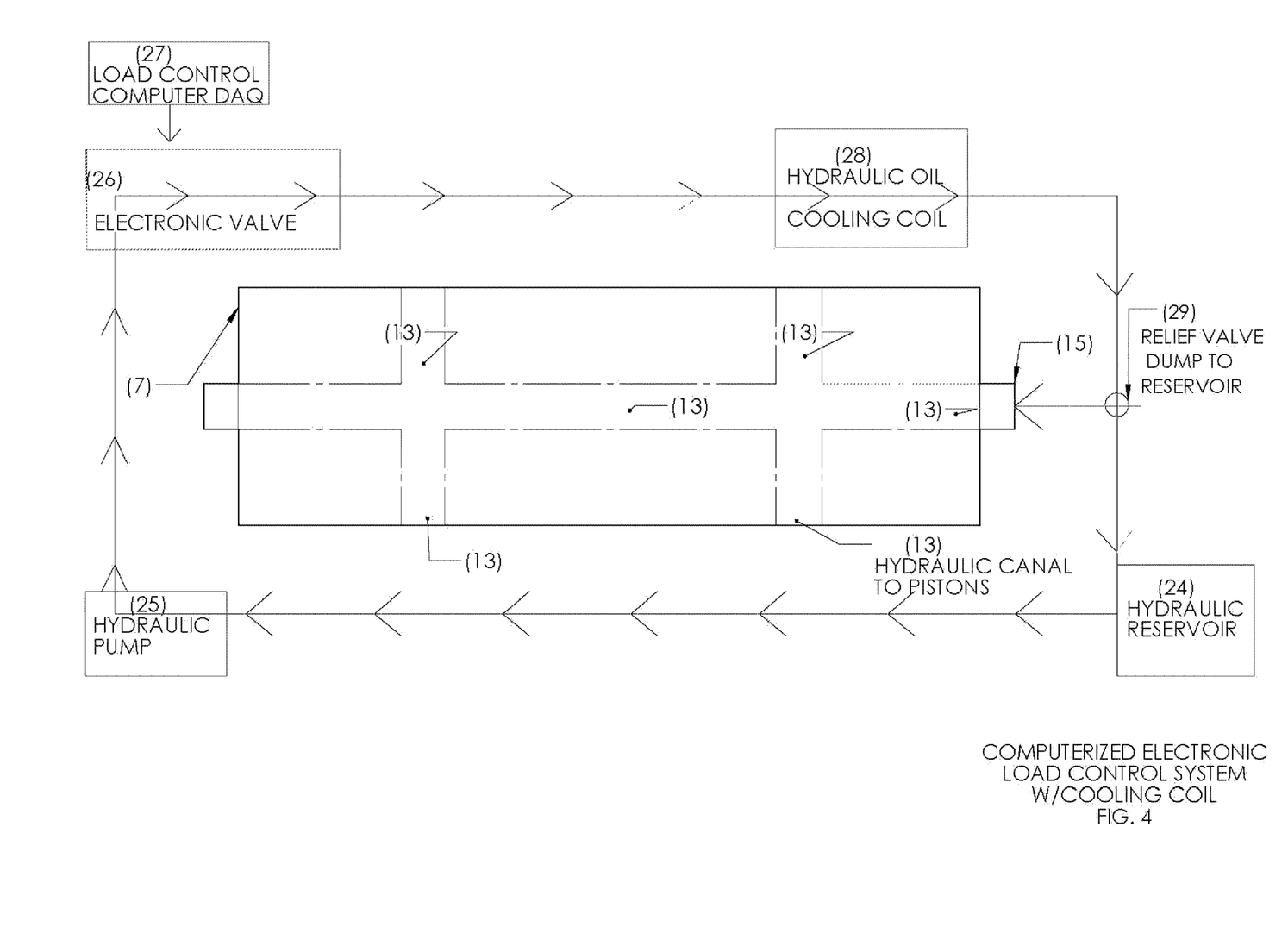
FIG. 4—A drawing depicting a schematic of the electronic load control system (ELCS).

Referring to FIG. 4, the computerized electronic load control system (CELCS) consists of a hydraulic oil reservoir (24), hydraulic pump (25) (preferably with an electric motor to provide constant hydraulic pressure allowing constant torque output from the DQPS (7)), electronic hydraulic valve (EV) (26), data acquisition/load computer (DAQ) (27) capable of outputting an electronic charge to operate the electronic valve (EV) (26), an inline hydraulic oil cooling coil (IHOCC) (28), and a manual relief valve (MRV) (29) to dump pressure back to the hydraulic reservoir (24). The CELCS is a new system for prony brake dynamometers. Prior art used a manual valve, or a combination of manual valves. The DAQ (27) and EV (26) used together allows thousands of new settings of rpm, torque, and horsepower over previous art of manual valves. The end user can establish a set point of rpm, torque, or power and maintain said set point by using the DAQ (27) to read the input signals from the rpm magnetic pickup (36) and load cell (16) and signaling the EV (26) to open or close, thereby increasing or decreasing the load to the dynamometer. The CELCS uses a real-time dedicated processor in the DAQ (27) resulting in reaction time in the milliseconds.

Another component of the CELCS is an inline hydraulic oil cooling coil (IHOCC) (28). The hydraulic oil experiences an increase in temperature as the EV (26) increases PSI by closing down of the valve The positioning of the IHOCC (28) is critical and is positioned directly after the electronic valve (26) to reduce the increased temperature of the hydraulic oil before it enters the stator shaft (15) of the DQPS (7). The reduced oil temperature results in a cooler operating temperature within the DQPS (7), which protects its components from excessive thermal breakdown as well as protecting the internal silicone lubricating fluid. Prior art has no usage of an inline hydraulic oil cooling coil.

Another component of the CELCS is a manual relief valve (MRV) (29) positioned at the hydraulic oil input (15). The MRV (29), when fully closed, directs all the pressurized hydraulic oil to the DQPS (7). When the MRV (29) is open, pressurized hydraulic oil bypasses the DQPS (7) and returns to the hydraulic oil reservoir (24). The function of the MRV (29) is critical in providing no psi to the DQPS (7) thereby allowing the dynamometer to run at minimal operating power loads. The MRV (29) also serves as an emergency relief valve releasing all the load to the dynamometer when opened. Prior art has no usage of a manual relief valve.

Figure 5:
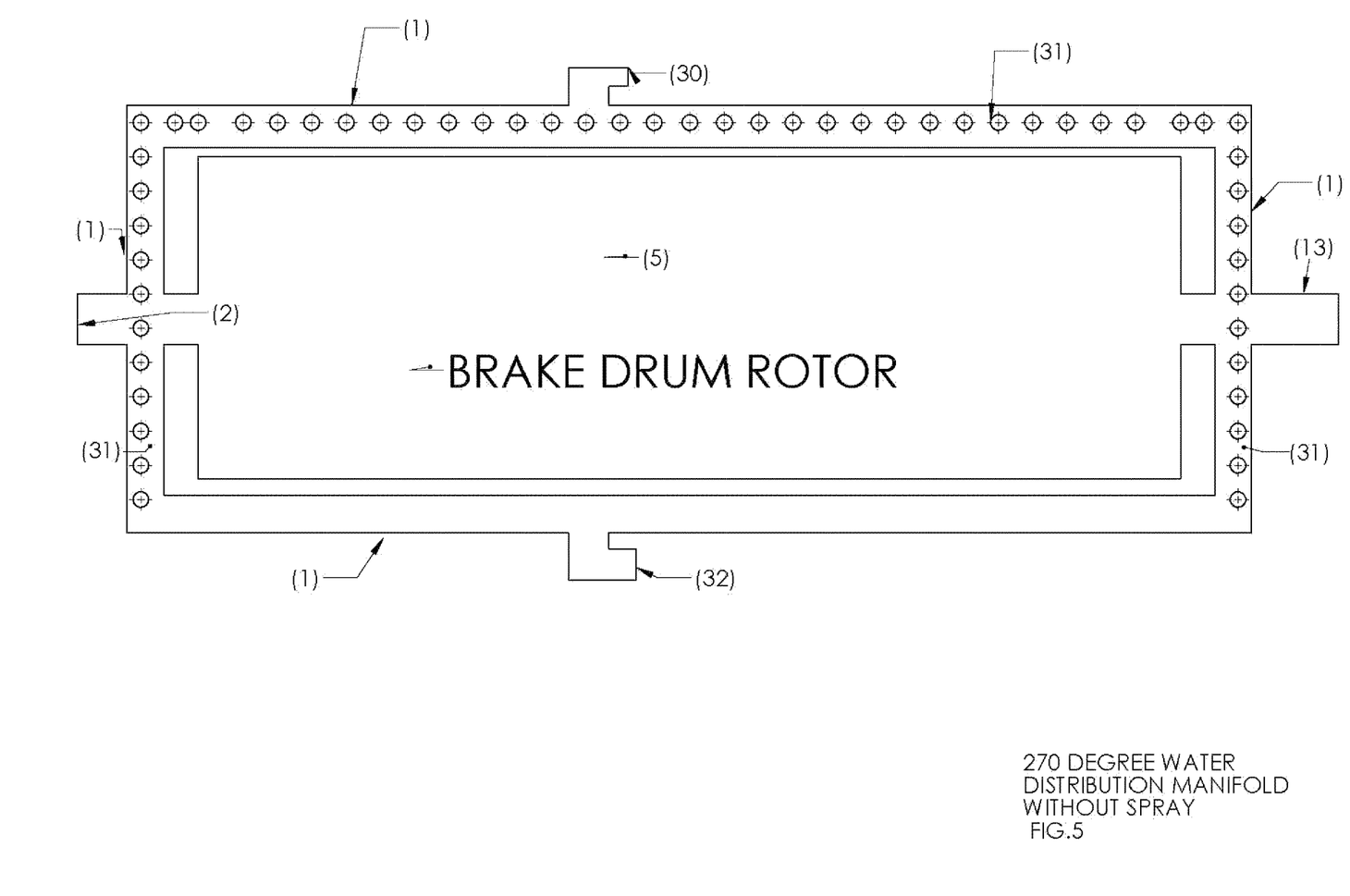
FIG. 5—A drawing depicting an overview of the 270-degree water distribution manifold (WDM).
Figure 5A:
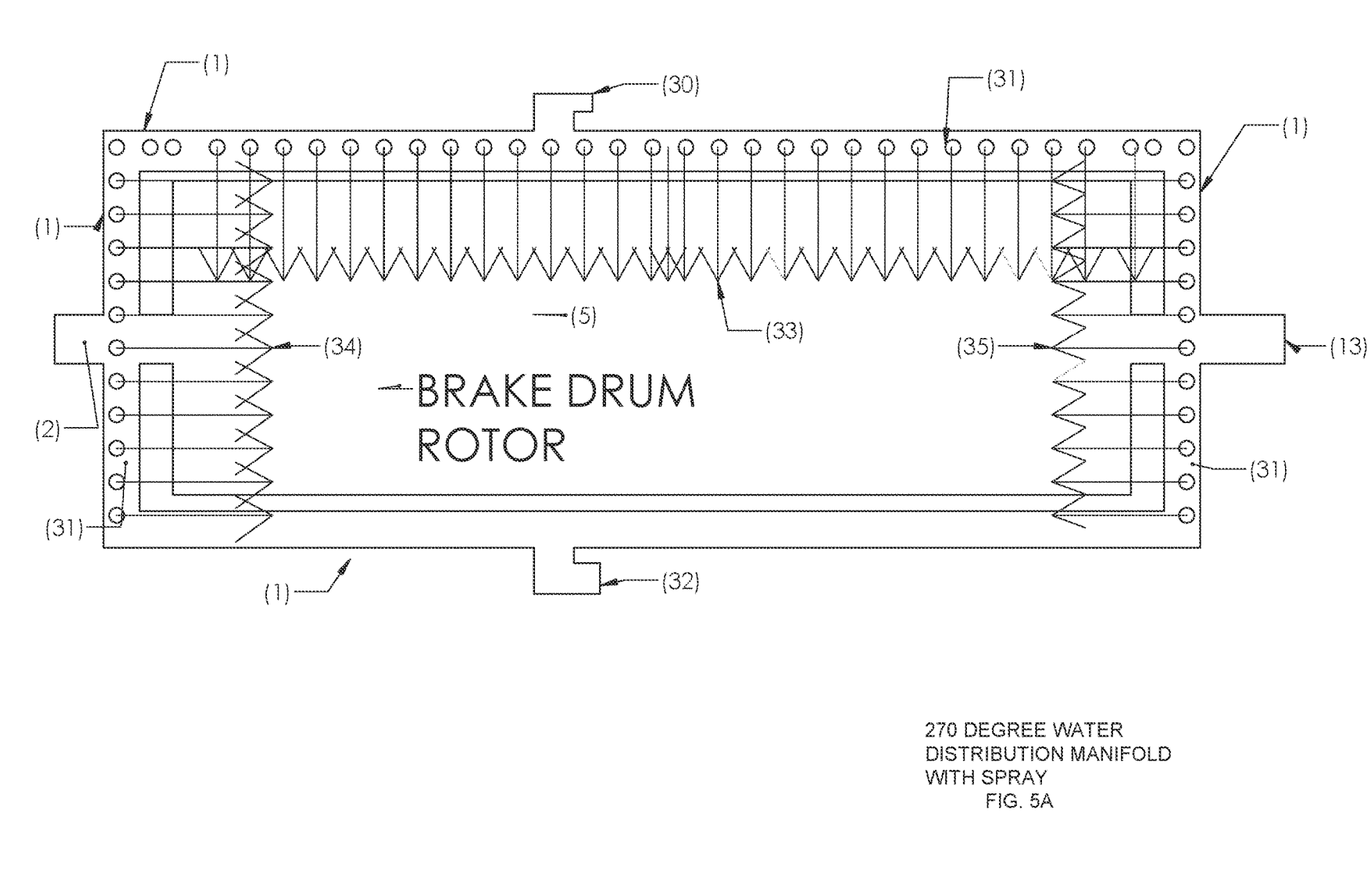
FIG. 5A—A drawing depicting the WDM and the corresponding spray pattern of incoming cooling water.

Referring to FIG. 5, depicted is a 270 degree water distribution manifold (WDM) (31) positioned in the top water tank (1) housing the brake drum rotor (5). Centered in the middle of WDM (31) is a pipe fitting for incoming cool water source (30). The WDM (31) is constructed of steel plate cut and welded in a rectangle shape to the inside wall of the top water tank (1), approximately one inch from the top. The WDM (31) runs the full length of the side of the top water tank (1) where it makes a 90-degree turn in the front and back to run the span of the end of the top water tank (1) stopping one inch short of the opposite side of the top water tank (1). One-quarter-inch holes are drilled in all the sides of the WDM (31). Referring to FIG. 5A, the WDM is shown with a large pipe fitting for the incoming cool water source a flow rate of at least 10 GPM, the result is a strong spray from the quarter-inch holes expanding at least the width and length of the upper water tank (1). The new incoming cool water cross spray (33), (34), and (35) covers the entire brake drum rotor, side (33), as well as the front (34) and rear (35) end bearing/seal housings. This cooling of critical areas of the dynamometer increases thermal protection resulting in extending the estimated useful life of the unit. Prior art used only a manifold on the side of the upper water tank leaving areas totally void of the incoming cool water source.

The invention claimed is:

1. A dynamometer capable of measuring the power output of a prime mover's rotating shaft comprising:
   a. An upper water tank containing cooling water and housing a load absorption unit consisting of a brake drum rotor and dual quad power stator and stator plate with a front input rotor shaft assembly and a rear splined stator shaft cradled within respective bearing and seal housings;
   b. A torque arm with a welded broached hub attached to the rear of the splined stator shaft with corresponding load cell attached to measure foot pounds of torque;
   c. An electronic load control system featuring an electronic valve controlled by a data acquisition computer to regulate hydraulic pressure delivered to the dual quad power stator; and
   d. A data acquisition computer to accumulate rpm and torque readings and calculate horsepower, to accumulate various sensors and thermocouple data, and export said calculations and data to a software system capable of loading on any laptop or desktop computer to present said calculations and data to a user of said laptop or desktop computer.

2. The dynamometer in claim 1 further comprising the input shaft and hub assembly proceeding through a water tank bearing housing, which is cradled in a trunnion bearing, and attaches by bolts to the single brake drum rotor.

3. The dynamometer in claim 1 further comprising the single brake drum rotor made of a cast iron pour with single rear lid, or a metal tube with front and rear lids.

4. The dynamometer in claim 1 further comprising the dual quad power stator made from a solid grey iron casting consisting of an opening for a stator shaft and openings for two sets of four piston cylinders positioned 90 degrees apart and spaced equally over the length of the stator.

5. The dynamometer in claim 1 further comprising the stator shaft with a port on the end to transport hydraulic fluid through a central canal to 8 ports accessing 8 cylinders of the stator.

6. The dynamometer in claim 4 further comprising a pair of O-Ring collars and seals mounted on the stator shaft and bolted to the side of the stator to seal the stator shaft.

7. The dynamometer in claim 4 further comprising an indentured groove in the piston cylinders and lip seals and back up rings inserted into said groove to seal the bearing and seal housings.

8. The dynamometer in claim 4 further comprising as part of the solid iron casting two torque bars extending the full length of the dual quad power stator and transferring torque to the stator shaft.

9. The dynamometer in claim 4 further comprising a hydraulic pressure equalizer plate with a concave radius and a set of 8 pistons shaped in a domed radius equal to the concave radius of said hydraulic pressure equalizer plate with centering pin.

10. The dynamometer in claim 1 further comprising a hydraulic pressure equalizer plate with centering holes spaced equally over the length of the plate, where the bottom of the stator plate has reciprocating concave indentures, the radius of which is the same as the radius of the dual quad power stator, and the top part of the stator plate has a radius equal to the inside diameter of the brake drum rotor, and further holes are drilled, and an indenture milled out to accommodate retracting springs connected to said hydraulic pressure equalizer plate.

11. The dynamometer in claim 1 further comprising a 270-degree water distribution manifold providing incoming coolant water in a cross-spray pattern to the brake drum rotor side and ends as well as to the front and rear bearing and seal housings and out of which used warm water flows through a fixture.

12. The dynamometer in claim 11 further comprising an incoming cool water fixture 180 degrees opposite the warm water outflow fixture in claim 11.

13. The dynamometer in claim 1 further comprising an electronic load control system consisting of a hydraulic oil reservoir, hydraulic pump, electronic hydraulic valve controlled by a data acquisition computer, regulating the hydraulic pressure to the dual quad power stator.

14. The dynamometer in claim 11 further comprising an inline cooling radiator capable of decreasing the temperature created from use of the electronic hydraulic valve in claim 11.

* * * * *